May 23, 1950     M. A. ADAMS     2,508,560
FISHING LURE
Filed Oct. 22, 1946
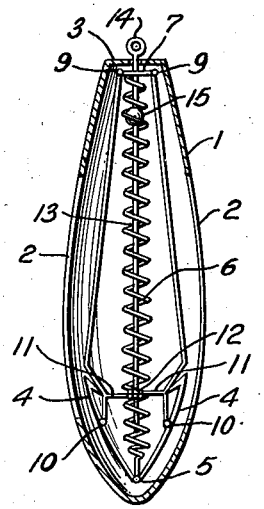
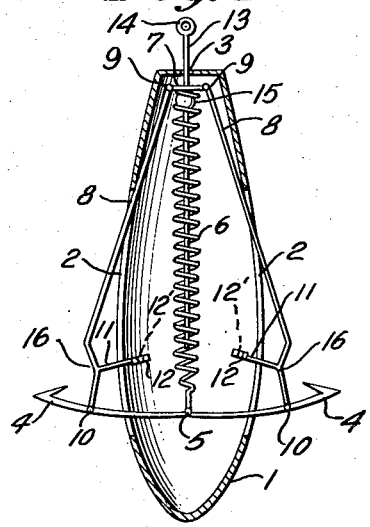
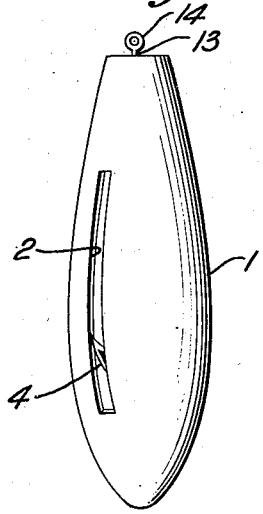
Inventor
MOZEL A. ADAMS
By McMorrow, Berman & Davidson
Attorneys Patented May 23, 1950

2,508,560

UNITED STATES PATENT OFFICE 2,508,560

FISHING LURE

Mozel A. Adams, Evangeline, La.

Application October 22, 1946, Serial No. 704,938

1 Claim. (Cl. 43—36)

This invention relates to improvements in fishing lures and more particularly to an improved artificial bait having enclosed therein expanding fish hooks adapted to engage and to hold the mouth of a fish which has struck at the lure.

Commonly used fishing lures and hooks suffer from the disadvantages that the hooks are generally visible, that the hooks easily become entangled in weeds or other submarine obstructions, and that the fish may not be hooked securely unless he is struck at exactly the right time.

It is an object of this invention to provide an artificial bait having the hooks retained in a position where they will not be visible and where they will be unable to engage weeds and the like. It is a further object to provide a bait in which the hooks are held under spring tension so that they are forcibly expanded when a fish strikes the bait, thus hooking the fish securely. A further object is to provide means in such a bait to prevent the hooks from becoming extended by accident, and to provide means for forcibly extending them when a fish strikes. Still other objects will become apparent from an inspection of the accompanying drawings and from the ensuing description of my novel device.

My invention may best be comprehended from a study of the drawings in which Figure 1 is a longitudinal section of the lure showing the hooks in the normal, retracted, inoperative position inside the artificial bait casing.

Figure 2 is a longitudinal section showing the hooks in expanded operative position.

Figure 3 is a side elevation of the lure, showing the longitudinal slots through which the hooks may be extended and illustrating the smooth exterior which is presented by the lure, which makes it particularly suitable for fishing in waters containing many weeds.

As shown in the drawings, the hooks and mechanism for extending them are enclosed within the artificial bait casing 1, which is similar in shape to a small fish and may be decorated or ornamented in any desired manner. The casing is provided with longitudinal slots 2 in its midsection, through which the hooks may extend. The casing also is provided with a small aperture 3 in the center of its top, and may be taken apart to permit insertion and removal of the actuating mechanism. Means for separating the casing for this purpose are not shown, but may consist of a threaded union at any point in the casing or, in case the top portion of the bait is narrowed somewhat less than shown, may consist of a threaded plug constituting the top of the bait.

The barbed hooks 4 are swingably connected to one another by means of a pivot pin 5, to which is also attached the lower end of a stiff spring 6. The upper end of this spring is attached to a cross bar 7. Side arms 8 are hinged to the ends of the cross bar by means of pivot pins 9. The side arms have inward offsets 16 near their lower ends to leave space for the hooks when in the retracted position as shown in Figure 1. The lower ends of the side arms are attached by means of pivot pins 10 to the hook arms. Lock arms 11 project inwardly from the lower portion of the side arms 8 and carry on their inward extremities small horizontal plates 12 having holes 12' drilled therein.

A latch pin 13 passes down through the aperture 3 in the top of the casing 1 and through the center of the spring 6. At its upper end is a loop 14 to which the fishing line may be attached, and at a short distance below the point where the pin enters the casing is an enlargement or ball 15, which prevents the pin from being entirely withdrawn from the casing. The pin 13 has a series of notches on its sides in order to engage the locking arms more securely and to prevent accidental dislodgement, with consequent extension of the hooks.

When the hooks are in their normal retracted position, the pin 13 is depressed and passes through the holes in the plates 12 at the end of the lock arms 11, thus preventing extension of the hooks. This position is shown in Figure 1. It will be seen that tension of the spring does not have any tendency to force the pin out of this position, but on the contrary tends to retain it as it is, since the plates 12 exert pressure in opposed outward directions only. This effect together with the notches on the sides of the pin is enough to prevent the pin becoming accidentally dislodged and to thus release the hooks prematurely.

When a fish strikes the bait, the entire casing is drawn away from the line, thus moving the pin 13 upwards to the point where it no longer passes through the holes in the plates 12. When this occurs, the spring contracts, ejecting the hooks with some force through the slots in the casing and causing them to engage the fish. The fish invariably becomes hooked securely in this manner, which results in many fewer losses caused by the hook becoming disengaged.

It will be apparent that instead of two hooks as shown, any convenient larger number may be employed. Regardless of the number, the hooks should be symmetrically arranged about the longitudinal axis of the casing.

While I find my invention most useful when applied to artificial baits of the type shown, it is also possible and often desirable to employ the expanding hook mechanism with real bait of various types.

My device has been described in terms of a specific embodiment thereof which I consider particularly advantageous. However it is to be understood that many variations are possible without departing from the essential spirit and scope of my invention and that I do not wish to be limited except to the invention as defined in the appended claim.

I claim:

An expansible fish hook, comprising a cross bar, at least a pair of side arms pivoted at their upper ends to opposite sides of said cross bar, a pair of barbed hooks, each hook being pivoted intermediate its ends to the lower end of one of said side arms, said hooks having inner ends pivotally connected together, a contractile coil spring having opposite ends attached to said cross bar and to said inner ends of said hooks, laterally inwardly directed lock arms fixed to said side arms between the ends of the latter, said lock arms including inner ends formed with holes therein, said holes being adapted to be aligned axially of said spring with said hooks in a retracted position whereby to expand said spring, and said cross bar being formed with an aperture therethrough axially of said spring, and a latch pin slidable in said aperture and including a lower end insertable through said aligned holes in said lock arms whereby to lock said hooks in said retracted position and said spring in an expanded condition, said latch pin including an upper end extending upwardly of said cross bar and formed with means for attaching said latch pin to a fishing line, and said latch pin being movable upwardly relative to said lock arms to disengage said lower end of said pin from said lock arms, whereby said spring is operative to contract and move said hooks to expanded positions.

MOZEL A. ADAMS.

REFERENCES CITED

The following references are of record in the file of this patent:

UNITED STATES PATENTS

| Number | Name | Date |
|---|---|---|
| 1,333,564 | Murray | Mar. 9, 1920 |
| 1,464,387 | Kishpaugh | Aug. 7, 1923 |
| 1,479,652 | Cranstone | Jan. 1, 1924 |